Patented June 13, 1933

1,913,368

UNITED STATES PATENT OFFICE

WILLIAM S. CALCOTT AND WILLIAM A. DOUGLASS, OF PENNS GROVE, NEW JERSEY, AND HERBERT W. WALKER, OF WILMINGTON, DELAWARE, ASSIGNORS TO E. I. DU PONT DE NEMOURS & COMPANY, OF WILMINGTON, DELAWARE, A CORPORATION OF DELAWARE

PRESERVATION OF OILS, FATS, FATTY OILS, FATTY ESTERS, FATTY ACIDS, FATTY ACID SALTS, AND RELATED COMPOUNDS

No Drawing. Application filed December 18, 1929. Serial No. 415,015.

This invention relates to the treatment of auto-oxidizable substances such as oils, fats, fatty oils, fatty esters, fatty acids and salts of fatty acids to retard deterioration and development of rancidification. More particularly it pertains to the addition of organic compounds to such substances in order to accomplish these results. Specifically, the incorporation of diaryl or diaralkyl compounds, such as hydroxy-diaryl-ethers into the material to be preserved is contemplated.

Butter, lard, cocoanut oil and other animal, vegetable and fatty oils, together with soap, the sodium or potassium salts of the fatty acids contained in these fats and fatty oils, tend to develop an objectionable rancid odor and taste on exposure to air under ordinary conditions. This deterioration is due to the oxidation of the fatty acid part of the fat or soap molecule by atmospheric action. The oxide derivatives which are first formed become decomposed or altered and produce substances having a rancid odor and taste.

Some work has been done in the fat preservation field as shown by U. S. P. 1,542,438 to Divine, wherein aniline, alpha naphthylamine, para phenylene-diamine, diphenylamine and hexamethylenetetramine are added to soap. In U. S. P. 1,575,529 to Bollman soya bean lecithin is added to edible oils. Other improvements in the keeping quality of auto-oxidizable substances are claimed in U. S. P. 1,672,657 to Powell according to which the condensation product of an aromatic amine and an aliphatic aldehyde is added to the material to be preserved. The foreign patent art also discloses work along this line as evidenced by B. P. 181,365 to Moureu and duFraisse who employ the phenols such as pyrogallol, guaiacol, and hydroquinone as stabilizers for auto-oxidizable substances. In B. P. 208,189 to Lever Bros. the phenols of the types hydroquinone, guaiacol and recorcinol are used to prevent deterioration of whale oil. Rechburg, Braun and Oetermann in D. R. P. 254,303 disclose sulfur and pyrogallol for the preservation of oils and fats. Boehringer in D. R. P. 308,408 discloses alkali lactates as suitable stabilizers for margarine, butter and lard. Many of the compounds heretofore employed, however, have been open to the objection that they either discolor the product to be preserved or form compounds that have this objectionable property. Certain compounds of the prior art impart to the product in which they are incorporated a distinctive odor. Other proposed preventives are actually ineffectual or are effective only for a short time.

This invention has as an object the preservation of fats, fatty oils, fatty esters, fatty acids, fatty acid salts and the like. A further object of this invention is to insure the retention of the original odors of these materials for indefinite periods. Still further objects are to prevent or retard the auto-oxidation of materials of this nature, to keep the materials sweet (in the sense of the odors given off) for a long period, to maintain the original chemical and physical states for extended periods, to prevent reaction of these substances or their constituent parts with the atmosphere or its constituent parts such as oxygen, to insure retention of the original properties of these substances without discoloring or imparting objectionable odors thereto, to prevent oxygen absorption by the materials to be preserved and generally overcome the objectionable features of the prior art. Other objects will appear hereinafter.

These objects are accomplished by the invention herein disclosed which is related to the invention of Application #391,706, filed September 10, 1929, by the same inventors in that it involves further work in the same field. In that application the preservation of oils, fats, etc. by the addition thereto of diaryl compounds is disclosed and in the examples set forth the aryl groups are directly connected. It has now been found that preservation may also be accomplished by compounds containing a plurality of aryl groups connected through or to an intermediary, such as, for example, an oxygen radical. In compounds of this class those having a hydroxy, alkoxy or amino radical attached to an aryl group are particularly effective.

According to this invention members of the hydroxy-diaryl-ether class of organic compounds are incorporated into the substances to be preserved. When so incorporated they act as anti-oxidants to prevent or retard the decomposition and rancidification. The general formula of the anti-oxidants used is HO-R-O-R'-Y where R and R' are aryl or aralkyl nuclei which may be alike or different and Y is hydrogen, hydroxy or alkoxy. The retarding agents may be incorporated in the oil or fatty substance in any suitable manner as, for example, by mixing, and at any time found preferably as, for instance, before or during preparation or in the natural or ordinary state. By way of illustrating the invention the following examples are given.

Example I

Cocoanut oil treated with 0.1% of 4:4'-dihydroxy diphenyl ether required 55 hours in an oxygen atmosphere of 80% relative humidity at 45° C. to absorb 2% by weight of oxygen, whereas the untreated control sample absorbed the same amount of oxygen in 18 hours. An inhibition of oxidation was secured by the use of 4:4'-dihydroxy diphenyl ether which constituted an improvement in the aging qualities of the cocoanut oil which otherwise would have shown the development of rancidity with oxidation. 4:4'-dihydroxy diphenyl ether may likewise be used to advantage in lard, butter, and other animal fats, in other vegetable oils which undergo auto-oxidation, such as cottonseed oil, and in soap.

Example II p-hydroxy diphenyl ether to the extent of 0.1% was incorporated in ordinary commercial lard and the sample exposed to the action of the atmosphere at room temperature along with an untreated control sample of the same lard. After 7 days the control sample possessed a rancid odor and gave a positive test for rancidity with the phloroglucinol Kreis reagent. On the other hand the stabilized lard containing p-hydroxy-diphenyl ether remained sweet to smell and gave no indication of rancid condition by the Kreis color reaction.

Example III

If 0.05% 4:4'-dihydroxy diphenyl ether be incorporated in soap, for example, white olive castile soap, and the soap exposed to the action of atmospheric oxygen at 60° C. and 80% relative humidity in such a way as to follow the oxygen absorption by changes in pressure, it will be found that the treated soap absorbs oxygen at a very much slower rate than a soap sample containing no antioxidant. An inhibition of oxidation is thus secured by the use of 4:4'-dihydroxy diphenyl ether in soap resulting in an improvement in the aging qualities of the soap which otherwise would have shown considerable deterioration and the development of rancidity.

The description of the Kreis color test may be found in J.I.E.C. 15, 1051 (1923). Briefly it is as follows. One tenth of a gram of fat dissolved in 5 cc. ether is shaken with 5 cc. concentrated HCl. The mixture is then shaken with 5 cc. 1% ether solution of phloroglucinol. The development of a typical red color in the HCl is regarded as a positive reaction.

It will be understood that the concentrations of antioxidant agents may vary to secure protection against deterioration to a less and greater degree depending on the nature of the fat, fatty oil or soap in question, the nature of the antioxidant, and the actual concentration of agent used. Ordinarily the amount of the preservative used ranges from 0.001 to 1.% but this invention contemplates greater amounts if there be a particular need therefor, although so far it has not been found necessary to use more than the maximum amount stated above. The preservatives listed are not harmful so far as applicants are aware, but it is probably advisable to limit their use in edible materials to small quantities. Accordingly the particular conditions of each case will determine the amount needed.

Certain substitutions in the general formula of groups analogous to the phenyl groups may be made without materially affecting the preservative properties of the compounds. For example, tolyl, naphthyl, dinaphthyl, and diphenyl groups and the like may be introduced in lieu of the phenyl groups or the hydroxy groups may be replaced by alkoxy groups as in p-ethoxy diphenyl ether.

Obviously when the aryl groups have substituents other than hydroxy or alkoxy the substituents must be of such nature as not to nullify the inhibitive effect of the main nucleus or neutralize the effect of the hydroxy or alkoxy group and must be compatible with the object in view.

As examples of the class of compounds described above which may be used effectively the following are given.

4:4'-dihydroxy diphenyl ether,

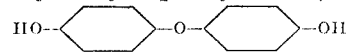

p-hydroxy diphenyl ether,

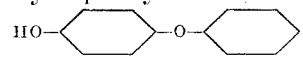

p-ethoxy diphenyl ether,

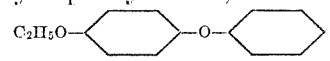

2:2'-dihydroxy diphenyl ether,

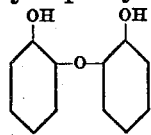

3:3-dihydroxy diphenyl ether,

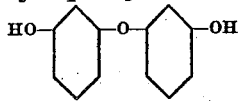

o-hydroxy diphenyl ether,

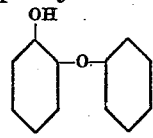

p-hydroxy phenyl diphenyl ether,

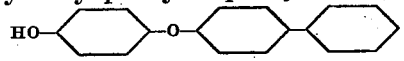

pp'-dihydroxy phenyl diphenyl ether,

o-hydroxy phenyl diphenyl ether,

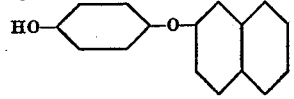

p-hydroxy phenyl-2-naphthyl ether,

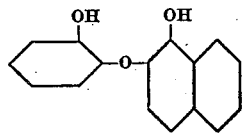

o-hydroxy phenyl-1-hydroxy-2-naphthyl ether,

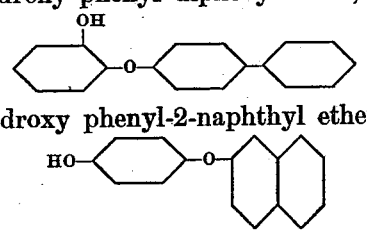

2:2'-dihydroxy-1-1'-dinaphthyl ether,

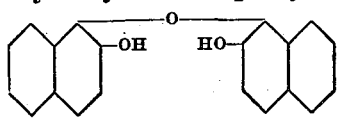

4:4'-dihydroxy-2:2'-dinaphthyl ether,

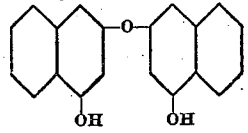

p-hydroxy diphenyl-2-naphthyl ether,

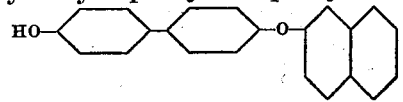

By the use of these retarding agents, auto-oxidation of these substances is effectively retarded, delayed or prevented in such a way that they remain sweet and apparently unchanged for long periods of time. In addition to being very good inhibitors of deterioration and development of rancidity, the class of compounds disclosed herein is light-stable and gives rise to substantially no discoloration of white or light colored fat and soap stocks. Fats and soaps when exposed to the action of sunlight or ultra-violet light show considerable discoloration in spite of the fact that they contain certain organic compounds heretofore employed for their preservation as, for example, diphenyl-amine.

The compounds herein disclosed avoid these drawbacks. In this case use is made of hydroxy-diaryl-ethers; of these compounds hydroxy-diphenyl-ethers are preferred. Especially good results have been obtained with para-hydroxy-diphenyl ether.

In this application the term "oxy-" is used generically and includes "hydroxy-" and "alkoxy-".

By the term "auto-oxidizable" is meant the capacity for spontaneous chemical combination with or absorption of oxygen of the atmosphere under ordinary conditions.

As many apparently widely different embodiments of this invention may be made without departing from the spirit and scope thereof, it is to be understood that we do not limit ourselves to the specific embodiments thereof except as defined in the appended claims.

We claim:

1. A composition of matter comprising a member of the group fats, fatty oils, fatty esters, fatty acids, and fatty acid salts together with 0.001 to 0.1% para-hydroxy-diphenyl ether as a rancidification preventative and inhibitor of oxidation.

2. A composition of matter including a member of the group fats, fatty oils, fatty esters, fatty acids, and fatty acid salts, and a compound having a plurality of aryl groups joined to an oxygen radical one of said aryl groups being substituted by a radical from the group comprising hydroxy and alkoxy.

3. A composition of matter including a member of the group fats, fatty oils, fatty esters, fatty acids, and fatty acid salts, and a compound having a plurality of aryl groups joined to an oxygen radical at least one of said aryl groups being substituted by a radical of the group consisting of hydroxy and alkoxy.

4. A composition of matter including a member of the group fats, fatty oils, fatty esters, fatty acids, and fatty acid salts, and a compound having a plurality of aryl groups joined to an oxygen radical at least one of which aryl groups is hydroxy substituted.

5. A composition of matter comprising a fat and a diaryl ether in which one of the aryl radicals is substituted by a radical of the group comprising hydroxy and alkoxy.

6. A composition of matter including a member of the group fats, fatty oils, fatty esters, fatty acids, and fatty acid salts, and a compound having a plurality of aryl groups joined to an oxygen radical at least one of said aryl groups being a phenyl group and at least one of said aryl groups being substituted by a radical of the group consisting of hydroxy and alkoxy.

7. A composition of matter including a member of the group oils, fats, fatty oils, fatty esters, fatty acids, and fatty acid salts, and a diphenyl ether, at least one of which phenyl groups is substituted by a radical of the group consisting of hydroxy and alkoxy.

8. A composition of matter including a member of the group fats, fatty oils, fatty esters, fatty acids, and fatty acid salts, and a diphenyl ether, one of said phenyl groups being hydroxy substituted.

9. A composition of matter including a member of the group fats, fatty oils, fatty esters, fatty acids, and fatty acid salts, and a compound of the class HO-R-O-R'-Y where R and R' are aryl or aralkyl nuclei which may be alike or different and Y is H or OH.

10. A composition of matter including a member of the group fats, fatty oils, fatty esters, fatty acids, and fatty acid salts, and a compound of the class HO-Phenyl-O-R'-Y where R' is an aryl group and Y is hydrogen, hydroxy or alkoxy.

11. A composition of matter comprising an animal fat together with a hydroxy diaryl ether compound as a rancidification preventative.

12. A composition of matter comprising a vegetable fat together with a hydroxy diaryl ether compound as a rancidification preventative.

13. A composition of matter comprising lard together with a hydroxy diaryl ether compound as a rancidification preventative.

14. A composition of matter comprising a cocoanut oil together with a hydroxy diaryl ether compound as a rancidification preventative.

15. A composition of matter comprising soap together with a hydroxy diaryl ether compound as a rancidification preventative.

16. A composition of matter comprising a chemical compound which includes the paraffin radical of fatty acids and as a rancidification preventative 0.001 to 1.% hydroxy diphenyl ether.

17. A composition of matter comprising a compound of the group consisting of fats, fatty oils, fatty esters, fatty acids and fatty acid salts and a diaryl ether in which one of the aryl radicals is substituted by a radical of the group consisting of hydroxy and alkoxy.

18. A composition of matter comprising a compound of the group consisting of fats, fatty oils, fatty esters, fatty acids, fatty acid salts and the like and as a rancidification retarder 0.001 to 1% of a hydroxy diphenyl ether.

19. A composition of matter probably comprising a member of the group consisting of fats, fatty oils, fatty esters, fatty acids and fatty acid salts and a diaryl ether, in which one of the aryl radicals is substituted by a radical from the group consisting of hydroxy and alkoxy, which is substantially identical with the product resulting from incorporating the said diaryl ether in a member of the aforesaid group of fatty materials.

In testimony whereof we affix our signatures.

WILLIAM S. CALCOTT.
WILLIAM A. DOUGLASS.
HERBERT W. WALKER.